US008126643B2

(12) United States Patent
Lehtiniemi et al.

(10) Patent No.: US 8,126,643 B2
(45) Date of Patent: Feb. 28, 2012

(54) METHOD, APPARATUS AND COMPUTER PROGRAM PRODUCT FOR PROVIDING INSTRUCTIONS TO A DESTINATION THAT IS REVEALED UPON ARRIVAL

(75) Inventors: Arto Lehtiniemi, Lempaala (FI); Antti Eronen, Tampere (FI); Jukka A. Holm, Tampere (FI)

(73) Assignee: Core Wireless Licensing S.a.r.l., Luxembourg (DE)

( * ) Notice: Subject to any disclaimer, the term of this patent is extended or adjusted under 35 U.S.C. 154(b) by 946 days.

(21) Appl. No.: 11/965,829

(22) Filed: Dec. 28, 2007

(65) Prior Publication Data
US 2009/0171559 A1      Jul. 2, 2009

(51) Int. Cl.
G01C 21/34 (2006.01)
A63F 13/10 (2006.01)

(52) U.S. Cl. ............ 701/211; 701/201; 701/209; 463/7; 707/732

(58) Field of Classification Search ............ 701/26, 701/27; 705/9
See application file for complete search history.

(56) References Cited

U.S. PATENT DOCUMENTS

| | | | |
|---|---|---|---|
| 6,098,118 A | 8/2000 | Ellenby et al. | |
| 6,278,940 B1* | 8/2001 | Endo | 701/209 |
| 6,360,167 B1* | 3/2002 | Millington et al. | 701/211 |
| 6,687,608 B2* | 2/2004 | Sugimoto et al. | 701/207 |
| 6,940,451 B2* | 9/2005 | Kanerva | 342/357.31 |
| 2002/0006825 A1* | 1/2002 | Suzuki | 463/40 |
| 2003/0101059 A1* | 5/2003 | Heyman | 704/275 |
| 2005/0027444 A1* | 2/2005 | Kim | 701/208 |
| 2005/0080665 A1 | 4/2005 | Bowman-Amuah | |
| 2006/0085128 A1* | 4/2006 | Grafe et al. | 701/213 |
| 2006/0271953 A1 | 11/2006 | Jacoby et al. | |
| 2007/0093955 A1* | 4/2007 | Hughes | 701/200 |
| 2007/0157227 A1 | 7/2007 | Carpenter et al. | |
| 2007/0159522 A1 | 7/2007 | Neven | |
| 2007/0282526 A1* | 12/2007 | Smith | 701/211 |
| 2008/0126961 A1* | 5/2008 | Naaman et al. | 715/764 |
| 2009/0005140 A1* | 1/2009 | Rose et al. | 463/7 |

FOREIGN PATENT DOCUMENTS

| | | |
|---|---|---|
| EP | 1744123 A2 * | 1/2007 |
| JP | 2005345237 A * | 12/2005 |
| WO | WO 9957521 A1 * | 11/1999 |

OTHER PUBLICATIONS

Davies, N., Cheverst, K., Mitchell, K., and Efat, A.; "Using and Determining locationin a Context-Sensitive Tour Guide"; IEEE Computer Magazine, pp. 35-41, 2001.*
Kitson, F., *Mobile Media: Making it a Reality*, available at http://www.acmqueue.org/modules.php?name=Content&pa=showpage&pid=303, dated Dec. 4, 2007, 5 pages. *2D Barcode FAQ*, available at http://www.barcodeman.com/faq/2d.php, dated Dec. 4, 2007, 4 pages.
*Edinburg Online Graphics Dictionary*, available at http://homepages.inf.ed.ac.uk.rbf/GRDICT/grdict.htm, dates Dec. 4, 2007, 23 pages.

* cited by examiner

*Primary Examiner* — Thomas Black
*Assistant Examiner* — Lin B Olsen
(74) *Attorney, Agent, or Firm* — Ditthavong Mori & Steiner, P.C.

(57) ABSTRACT

An apparatus for providing instructions to a destination that is revealed upon arrival may include a processor. The processor may be configured to receive indications of context associated with a user, determine a destination for the user based on the context and user information, provide for a presentation of guidance instructions to guide the user to the destination, and reveal the destination to the user only when the user is proximate to the destination.

19 Claims, 5 Drawing Sheets

METHOD, APPARATUS AND COMPUTER PROGRAM PRODUCT FOR PROVIDING INSTRUCTIONS TO A DESTINATION THAT IS REVEALED UPON ARRIVAL

TECHNOLOGICAL FIELD

Embodiments of the present invention relate generally to navigation and guidance technology and, more particularly, relate to a method, apparatus and computer program product for providing guidance instructions to a destination that is not revealed until arrival at the destination.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

Services provided may include the provision of navigation and guidance instructions. In this regard, many mobile terminals such as, for example, cellular telephones, are equipped with position tracking mechanisms. Global positioning system (GPS), cell identification, signal triangulation, or other mechanisms are commonly employed on such devices to determine the current location of the user's of the devices. Utilizing information regarding the location of a particular user, guidance instructions to a selected location may be provided. However, the selected location is typically determined by the user either entering in a specific address or name of a point of interest, or by the user identifying criteria associated with determining a destination and thereafter selecting or accepting one of the possible destinations provided that meet the criteria. As such, the user is aware of the destination to which the user is being guided.

Some users may consider the foreknowledge of the destination to be boring. Moreover, the destinations typically selected may be only those known to the user or those typically offered as options from which the user can select. As such, conventional mechanisms may be viewed as lacking in variety, mystery, and/or fun. Accordingly, it may be desirable to introduce a mechanism by which guidance to a particular destination is not conventional so at least some of the disadvantages described above may be overcome.

BRIEF SUMMARY

A method, apparatus and computer program product are therefore described for providing instructions to a destination that is revealed upon arrival. In this regard, for example, a destination may be determined based on user context and other information about the user. Moreover, instructions to the destination may be provided to the user, but the destination itself may not be revealed until the destination is reached.

In some embodiments, the user context may be determined, at least in part, based on information gathered using visual search techniques. For example, a visual image of an object or tag may be analyzed to determine a predefined association assigned to the object or tag. The predefined association, either alone or in combination with other context related information, may be used to determine user context. Utilizing the determined context, user information such as, for example, preferences, activity or a profile of the user, may be utilized in order to determine a destination for the user based on the user context and the user information. Guidance instructions to the destination may then be provided to the user in a manner that does not reveal the destination to the user until the destination is reached.

In one exemplary embodiment, a method of providing instructions to a destination that is revealed upon arrival at the destination is provided. The method may include receiving indications of context associated with a user, determining a destination for the user based on the context and user information, providing for a presentation of guidance instructions to guide the user to the destination, and revealing the destination to the user only when the user is proximate to the destination.

In another exemplary embodiment, a computer program product for providing instructions to a destination that is revealed upon arrival at the destination is provided. The computer program product includes at least one computer-readable storage medium having computer-readable program code portions stored therein. The computer-readable program code portions include first, second, third and fourth executable portions. The first executable portion is for receiving indications of context associated with a user. The second executable portion is for determining a destination for the user based on the context and user information. The third executable portion is for providing for a presentation of guidance instructions to guide the user to the destination. The fourth executable portion is for revealing the destination to the user only when the user is proximate to the destination.

In another exemplary embodiment, an apparatus for providing instructions to a destination that is revealed upon arrival at the destination is provided. The apparatus may include a processor. The processor may be configured to receive indications of context associated with a user, determine a destination for the user based on the context and user information, provide for a presentation of guidance instructions to guide the user to the destination, and reveal the destination to the user only when the user is proximate to the destination.

In another exemplary embodiment, an apparatus for providing instructions to a destination that is revealed upon arrival at the destination is provided. The apparatus includes means for receiving indications of context associated with a user, means for determining a destination for the user based on the context and user information, means for providing for a presentation of guidance instructions to guide the user to the destination, and means for revealing the destination to the user only when the user is proximate to the destination.

Embodiments of the invention may provide a method, apparatus and computer program product for employment in devices to enhance user enjoyment of a mobile terminal. In this regard, embodiments may provide an interesting way to advertise services, shop or tour a city, find services, etc.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Embodiments of the present invention provide, as indicated above, a mechanism by which context information associated with a particular user and the particular user's preferences, activity, profile and/or the like may be used to determine a destination for the particular user. Context is generally defined as any information that can be used to characterize the situation of an entity. An entity may be a person, place or object (e.g., the user or the user's mobile terminal) that is considered relevant to an interaction between a user and an application, including the user and the application themselves. Accordingly, a system may be considered context aware if the system uses context information to provide relevant information and/or services to the user such as where relevancy depends on the user's task.

Context may be determined, for example, based on a determination of various context parameters. Embodiments of the present invention will be described below in connection with numerous ways that context parameters may be determined. Moreover, examples of devices and applications that may determine particular context parameters will be described below. For example, a robust system for determining context parameters using visual search techniques is described below. However, it should be understood that embodiments of the present invention may be practiced in connection with much less robust systems for determining context parameters than that which will be described below. In this regard, although visual search techniques may be used in one embodiment for determining at least some context parameters, it is not necessarily required that visual search be practiced in the manner described below in order to determine context parameters for all embodiments of the present invention. Accordingly, other mechanisms for determining context may be used in addition to or instead of visual search techniques. As such, it should be appreciated that some of the devices described below may be omitted in certain embodiments.

Context parameters may include parameters related to, for example, environmental context, social context, spatio-temporal context, task context, personal context, terminal context, service context, access context, and/or the like. Environmental context may describe the entities around the user (e.g., the user of an electronic device) and the environment in which the user and the user's device are located. Social context may include information about relationships with other individuals (e.g., friends, relatives, co-workers, etc.). Spatio-temporal context may define the user's location (e.g., physical or geographical location) in the real world at a certain point in time. Task context may describe information related to on-going tasks. Task context may be determined, for example, from calendar applications or the execution of other applications at a particular time. Personal context may be related to physiological state (e.g., blood pressure, heart rate, or the like) or mental state (e.g., mood, stress level, or the like) of the user. Terminal context may be related to or descriptive of the status and/or capabilities of the user's device. Service context may relate to or be descriptive of services that are available at a particular location (or point of interest (POI)). For example, for a given location or POI, the service context may include the name of the service, the type or genre of the service, the state of the service (e.g., open/closed, on sale, happy hour, lunch or dinner rush, etc.), the cost of the service, and/or the like. Access context may describe the status of network connectivity.

Visual search functions such as, for example, mobile visual search functions performed on a mobile terminal, may leverage large visual databases using image matching to compare a query or input image with images in the visual databases. Image matching may tell how close the input image is to images in the visual database. If the image includes a particular object or POI that matches a known object or POI in the visual database, context information or parameters associated with the image may then be determined based on the comparison (or match). Accordingly, simply by pointing a camera mounted on the mobile terminal toward a particular object, the user can potentially get context information associated with the particular object and therefore associated with the user and/or the user's mobile terminal (e.g., at least by virtue of the user's proximity to the object). Since many of the context parameters described above can be determined based on or in connection with visual search techniques, an exemplary embodiment of the present invention will now be described in connection with a robust terminal and system for utilization of visual search techniques by way of example, and not of limitation.

Figure 1:
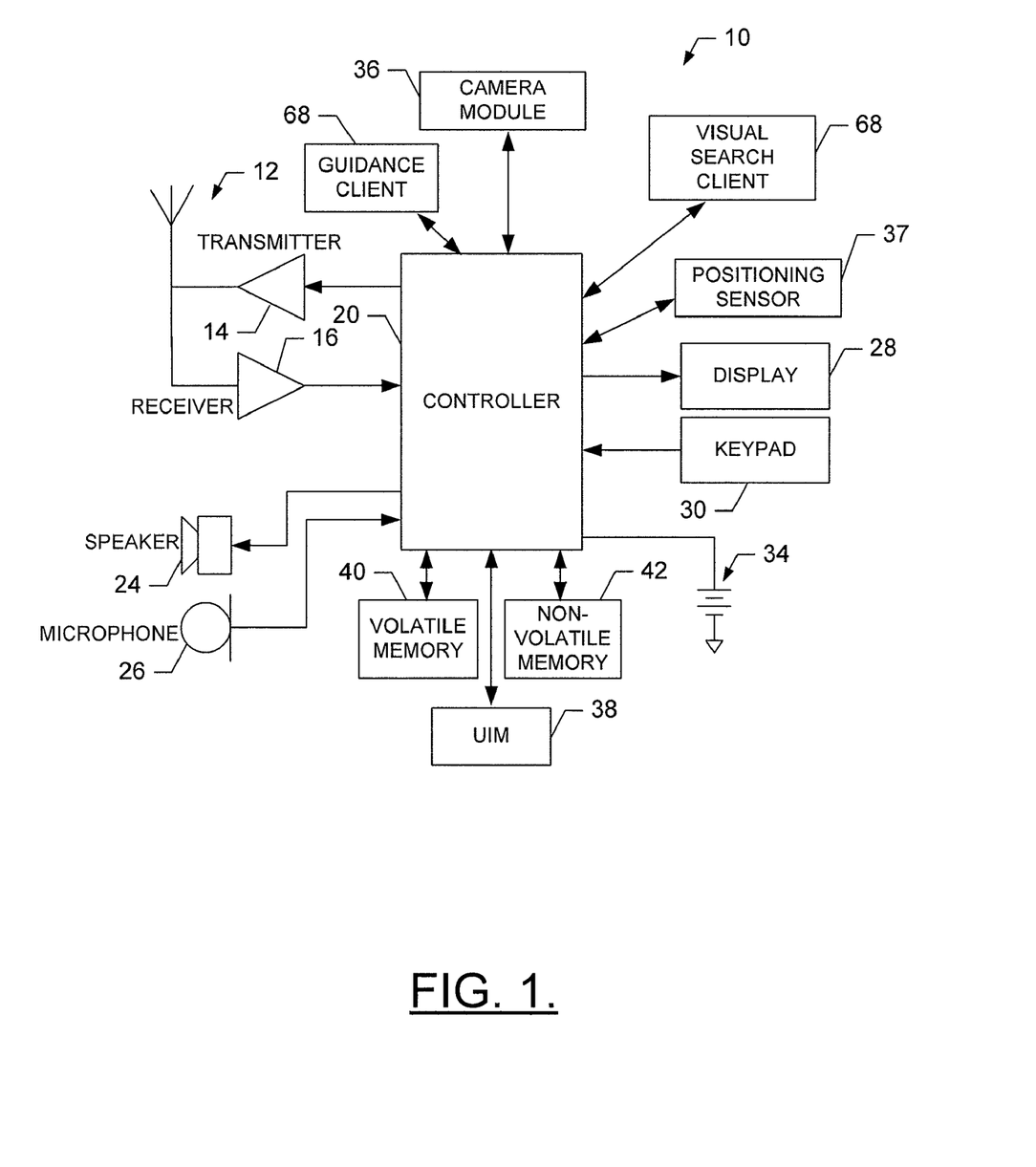
FIG. 1 is a schematic block diagram of a mobile terminal according to an exemplary embodiment of the present invention.

In this regard, FIG. 1 illustrates a block diagram of a mobile terminal 10 that may benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes an apparatus, such as a controller 20 or other processing element, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

It is understood that the apparatus such as the controller 20 includes circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and/or soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a media capturing element, such as a camera, video and/or audio module, in communication with the controller 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. As yet another alternative, an object or objects within a field of view of the camera module 36 may be displayed on the display 28 of the mobile terminal 10 to illustrate a view of an image currently displayed which could be captured if desired by the user. As such, as referred to hereinafter, an image could be either a captured image or an image comprising the object or objects currently displayed by the mobile terminal 10, but not necessarily captured in an image file. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to, for example, a joint photographic experts group (JPEG) standard or other format. Additionally, or alternatively, the camera module 36 may include one or more views such as, for example, a first person camera view and a third person map view.

In some embodiments, the mobile terminal 10 may include or be in communication with other devices or modules that may be useful in gathering context information. For example, the camera module 36 may include, be in communication with, or itself be embodied as a bar code reader. As such, the camera module 36 may enable the mobile terminal 10 to read bar codes (e.g., one dimensional and two dimensional bar codes) that may be within the field of view of the camera module 36. In another exemplary embodiment, the mobile terminal 10 may include a biometric sensor (not shown) that may be utilized to determine personal context information.

The mobile terminal 10 may further include a positioning sensor 37 such as, for example, a global positioning system (GPS) module in communication with the controller 20. The positioning sensor 37 may be any means, device or circuitry for locating the position of the mobile terminal 10. Additionally, the positioning sensor 37 may be any means, circuitry or device for locating the position of a point-of-interest (POI), in images captured by the camera module 36, such as for example, shops, bookstores, restaurants, coffee shops, department stores and other businesses and the like. As such, points-of-interest as used herein may include any entity of interest to a user, such as products and other objects and the like. The positioning sensor 37 may include all hardware for locating the position of a mobile terminal or a POI in an image. Alternatively or additionally, the positioning sensor 37 may utilize a memory device of the mobile terminal 10 to store instructions for execution by the controller 20 in the form of software necessary to determine the position of the mobile terminal or an image of a POI. Although the positioning sensor 37 of this example may be a GPS module, the positioning sensor 37 may include or otherwise alternatively be embodied as, for example, an assisted global positioning system (Assisted-GPS) sensor, or a positioning client, which may be in communication with a network device to receive and/or transmit information for use in determining a position of the mobile terminal 10. In this regard, the position of the mobile terminal 10 may be determined by GPS, as described above, cell ID, signal triangulation, or other mechanisms as well. In one exemplary embodiment, the positioning sensor 37 includes a pedometer or inertial sensor. As such, the positioning sensor 37 may be capable of determining a location of the mobile terminal 10, such as, for example, longitudinal and latitudinal directions of the mobile terminal 10, or a position relative to a reference point such as a destination or start point such as with an indication of compass direction and distance from the reference point. Information from the positioning sensor 37 may then be communicated to a memory of the mobile terminal 10 or to another memory device to be stored as a position history or location information. Additionally, the positioning sensor 37 may be capable of utilizing the controller 20 to transmit/receive, via the transmitter 14/receiver 16, locational information such as the position of the mobile terminal 10 and a position of one or more POIs to a server such as, for example, a visual search server 51 and/or a visual search database 53 (see FIG. 2), described more fully below.

The mobile terminal 10 may also include a visual search client 68 (e.g., a unified mobile visual search/mapping client). The visual search client 68 may be any means such as a device or circuitry embodied in hardware, software, or a combination of hardware and software that is capable of communication with the visual search server 51 and/or the visual search database 53 (see FIG. 2) to process a query (e.g., an image or video clip) received from the camera module 36 for providing results including images having a degree of similarity to the query. For example, the visual search client 68 may be configured for recognizing (either through conducting a visual search based on the query image for similar images within the visual search database 53 or through communicating the query image (raw or compressed), or features of the query image to the visual search server 51 for conducting the visual search and receiving results) objects and/or points-of-interest when the mobile terminal 10 is pointed at the objects and/or POIs or when the objects and/or POIs are in the line of sight of the camera module 36 or when the objects and/or POIs are captured in an image by the camera module 36.

In an exemplary embodiment, the mobile terminal 10 may also include a guidance client 69. The guidance client 69 may be any means such as a device or circuitry embodied in hardware, software, or a combination of hardware and software that is configured to receive guidance instructions from a serving device (e.g., the guidance server 55 of FIG. 2) and present such instructions to the user (e.g., via the display 28 and/or speaker 24).

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
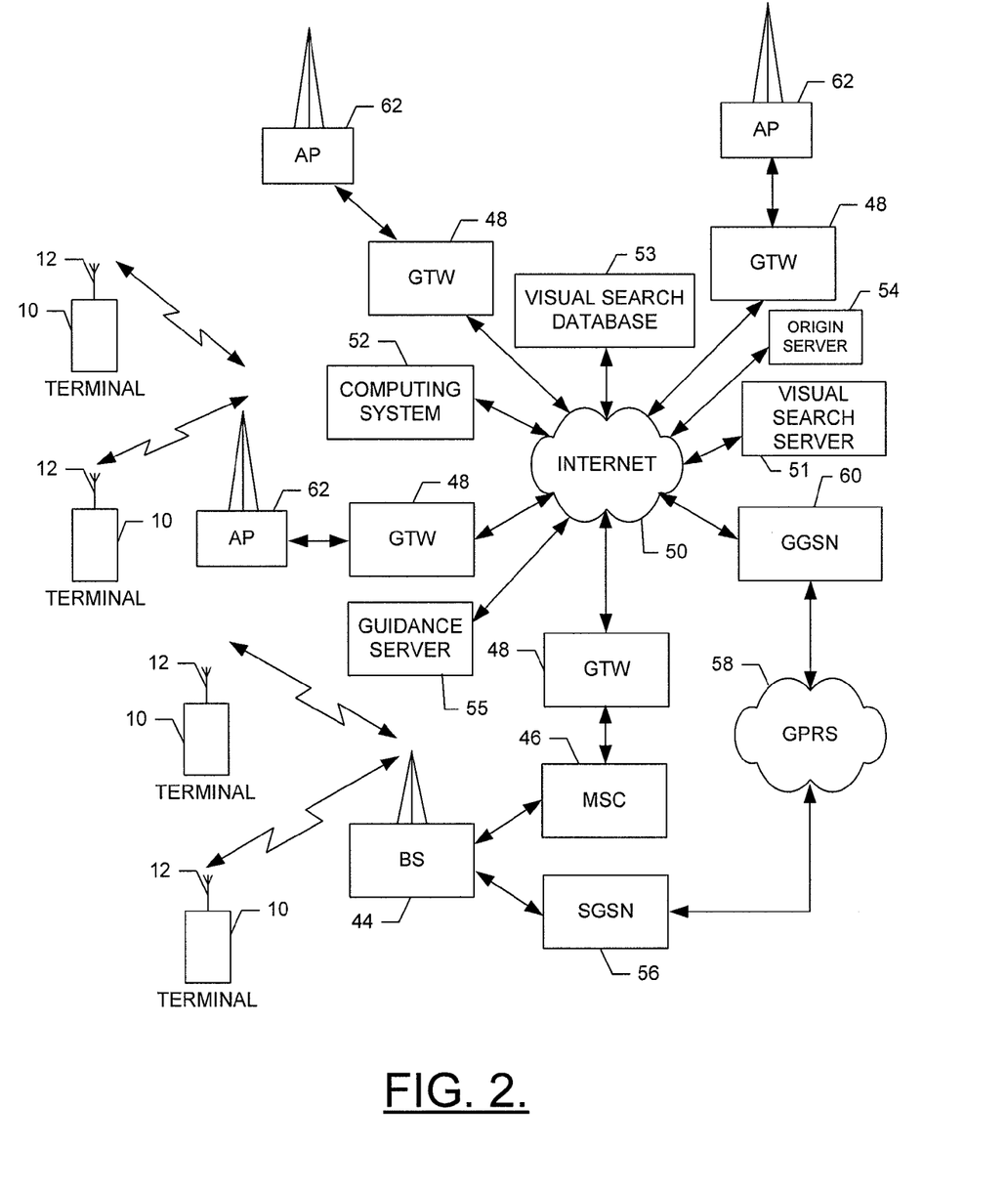
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52, origin server 54, the visual search server 51, the visual search database 53, and/or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, visual search server 51, visual search database 53, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), world interoperability for microwave access (WiMAX) techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

As will be appreciated, by directly or indirectly connecting the mobile terminals 10 and the computing system 52, the origin server 54, the visual search server 51, the visual search database 53 and/or any of a number of other devices, to the Internet 50, the mobile terminals 10 can communicate with one another, the computing system, 52, the origin server 54, the visual search server 51, the visual search database 53, etc., to thereby carry out various functions of the mobile terminals 10, such as to transmit data, content or the like to, and/or receive content, data or the like from, the computing system 52, the origin server 54, the visual search server 51, and/or the visual search database 53, etc. The visual search server 51, for example, may be embodied as one or more other servers such as, for example, a visual map server that may provide map data relating to a geographical area of one or more mobile terminals 10 or one or more points-of-interest (POI) or a POI server that may store data regarding the geographic location of one or more POI and may store data pertaining to various points-of-interest including but not limited to location of a POI, category of a POI, (e.g., coffee shops or restaurants, sporting venue, concerts, etc.) product information relative to a POI, and the like. Accordingly, for example, the mobile terminal 10 may capture an image or video clip which may be transmitted as a query to the visual search server 51 for use in comparison with images or video clips stored in the visual search database 53. As such, the visual search server 51 may perform comparisons with images or video clips taken by the camera module 36 and determine whether or to what degree these images or video clips are similar to images or video clips stored in the visual search database 53.

Although not shown in FIG. 2, in addition to or in lieu of coupling the mobile terminal 10 to computing systems 52 and/or the visual search server 51 and visual search database 53 across the Internet 50, the mobile terminal 10 and computing system 52 and/or the visual search server 51 and visual search database 53 may be coupled to one another and communicate in accordance with, for example, RF, BT, IrDA or any of a number of different wireline or wireless communication techniques, including LAN, WLAN, WiMAX, UWB techniques and/or the like. One or more of the computing system 52, the visual search server 51 and visual search database 53 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing system 52, the visual search server 51 and the visual search database 53, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In an exemplary embodiment, the system of FIG. 2 may further include a guidance server 55. The guidance server 55 may be configured to provide guidance services (e.g., to the guidance client 69) based on context information associated with the mobile terminal 10 and/or the user of the mobile terminal 10 in accordance with embodiments of the present invention.

In an exemplary embodiment, content such as image content, location information, guidance information and/or POI information may be communicated over the system of FIG. 2 between a mobile terminal, which may be similar to the mobile terminal 10 of FIG. 1 and a network device of the system of FIG. 2, or between mobile terminals. For example, a database may store the content at a network device of the system of FIG. 2, and the mobile terminal 10 may desire to search the content for a particular object. Similarly, the mobile terminal 10 may desire instructions to a destination chosen based on the context of the mobile terminal 10 and user information related to the user of the mobile terminal 10. Thus, information may be communicated between the mobile terminal 10 and a device of the system of FIG. 2 (e.g., the guidance server 55) to enable directions to be provided to the mobile terminal 10 to a location selected by the device (e.g., the guidance server 55) that is not revealed to the mobile terminal 10 until arrival at the selected location. However, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, or may be resident on a network device or other device accessible to the communication device (or on a combination of such devices).

Figure 3:
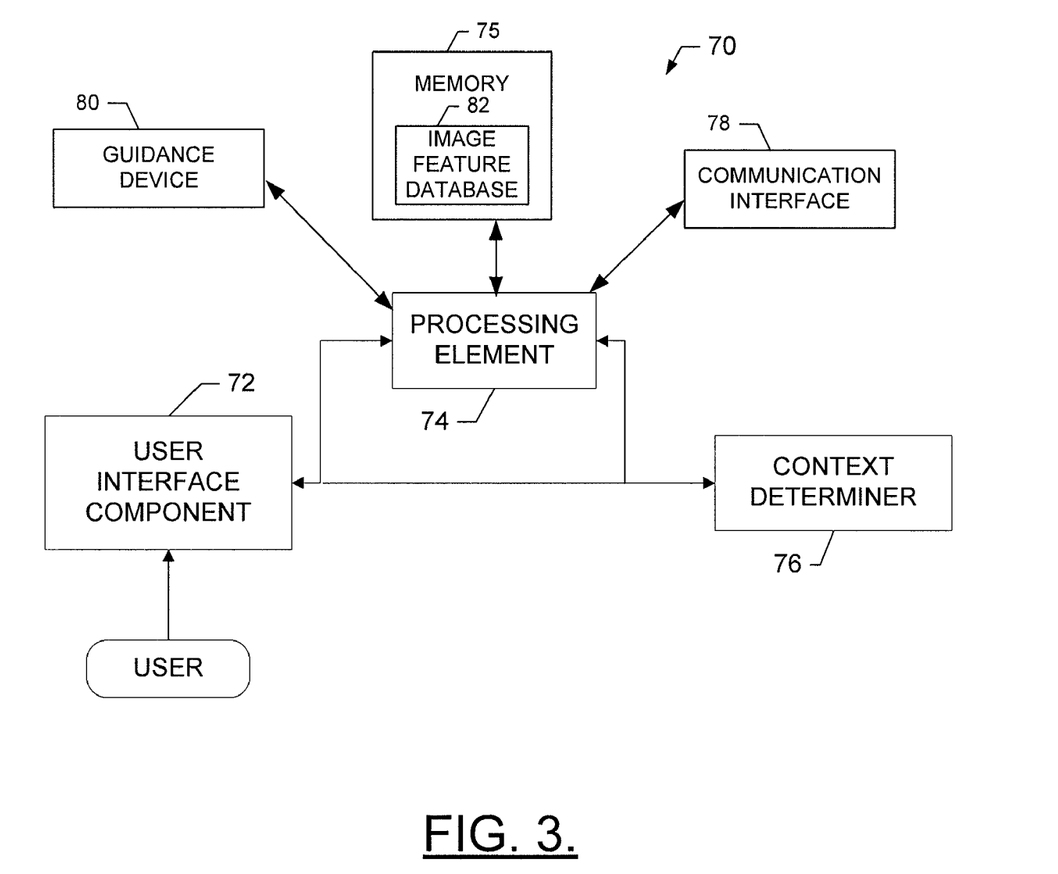
FIG. 3 illustrates a block diagram of an apparatus for providing instructions to a destination that is revealed upon arrival at the destination according to an exemplary embodiment of the present invention.

FIG. 3 illustrates a block diagram of an apparatus for providing instructions to a destination that is revealed upon arrival at the destination according to an exemplary embodiment of the present invention. The apparatus of FIG. 3 will be described, for purposes of example, in connection with the mobile terminal 10 of FIG. 1. However, it should be noted that the apparatus of FIG. 3 may also be employed in connection with a variety of other devices, both mobile and fixed, and therefore, embodiments of the present invention should not be limited to application on devices such as the mobile terminal 10 of FIG. 1. In this regard, embodiments may also be practiced in the context of a client-server relationship in which the client (e.g., the visual search client 68 or the guidance client 69) issues a query or request to the server (e.g., the visual search server 51 or the guidance server 55) and the server practices embodiments of the present invention and communicates results to the client. Alternatively, some of the functions described below may be practiced on the client, while others are practiced on the server. Decisions with regard to what processes are performed at which device may typically be made in consideration of balancing processing costs and communication bandwidth capabilities. It should also be noted, that while FIG. 3 illustrates one example of a configuration of an apparatus for providing instructions to a destination that is revealed upon arrival at the destination, numerous other configurations may also be used to implement embodiments of the present invention.

Referring now to FIG. 3, a guidance apparatus 70 for providing instructions to a destination that is revealed upon arrival at the destination is provided. In exemplary embodiments, the guidance apparatus 70 may be embodied at either one or both of the mobile terminal 10 and/or another network device. In other words, portions of the search apparatus 70 may be resident at the mobile terminal 10 while other portions are resident at a server device of a network. Alternatively, the guidance apparatus 70 may be resident entirely on the mobile terminal 10 or entirely on a server device of the network. The guidance apparatus 70 may include a user interface component 72, a processing element 74, a memory 75, a context determiner 76, a communication interface 78, and a destination selector/guide 80. When embodied at a server device, the guidance apparatus may omit a user interface.

In an exemplary embodiment, the processing element 74 could be embodied as the controller 20 of the mobile terminal 10 of FIG. 1 or as a processor or controller of a network device such as a server of FIG. 2 (e.g., the guidance server 55 and/or the visual search server 51). However, alternatively, the processing element 74 could be a processing element of a different device. Processing elements as described herein may be embodied in many ways. For example, the processing element 74 may be embodied as a processor, a coprocessor, a controller or various other processing means, circuits or devices including integrated circuits such as, for example, an ASIC (application specific integrated circuit) or an FPGA (field programmable gate array). In an exemplary embodiment, the user interface component 72, the context determiner 76, the communication interface 78 and/or the destination selector/guide 80 may be controlled by or otherwise embodied as the processing element 74.

The communication interface 78 may be embodied as any means such as a device or circuitry embodied in either hardware, software, or a combination of hardware and software that is configured to receive and/or transmit data from/to a network and/or any other device or module in communication with an apparatus (e.g., the guidance apparatus 70) that is employing the communication interface 78. In this regard, the communication interface 78 may include, for example, an antenna and supporting hardware and/or software for enabling communications via a wireless communication network. Additionally or alternatively, the communication interface 78 may be a mechanism by which location information and/or indications of an image (e.g. a query) may be communicated to the processing element 74 and/or the context determiner 76. Accordingly, in an exemplary embodiment, the communication interface 78 may be in communication with a device such as the camera module 36 (either directly or indirectly via the mobile terminal 10) for receiving the indications of the image and/or with a device such as the positioning sensor 37 for receiving location information identifying a position or location of the mobile terminal 10. In some embodiments, the destination selector/guide 80 may be in communication with other elements of FIG. 3 via the communication interface 78 as well.

The user interface component 72 may be any means such as a device or circuitry embodied in either hardware, software, or a combination of hardware and software that is capable of receiving user inputs and/or providing an output to the user. The user interface component 72 may include, for example, a keyboard, keypad, function keys, mouse, scrolling device, touch screen, or any other mechanism by which a user may interface with the guidance apparatus 70. The user interface component 72 may also include a display, speaker or other output mechanism for providing an output to the user. In an exemplary embodiment, rather than including a device for actually receiving the user input and/or providing the user output, the user interface component 72 could be in communication with a device for actually receiving the user input and/or providing the user output. As such, the user interface component 72 may be configured to receive indications of the user input from an input device and/or provide messages for communication to an output device. In this regard, the user interface component 72 may be a portion of or embodied as the communication interface 78.

In an exemplary embodiment, the user interface component 72 may be configured to be utilized by the user to provide indications of an image. The indications of the image may be, for example, an image currently within the field of view of the camera module 36 (although not necessarily captured) or a captured image including content providing a basis for a content based retrieval operation. In other words, the indications of the image may be a newly created image that the user has captured at the camera module 36 or merely an image currently being displayed on a viewfinder (or display) of the device employing the camera module 36. In alternative embodiments, the indications of the image could include a raw image, a compressed image (e.g., a JPEG image), or features extracted from an image. Any of the raw image, compressed image or features from an image could form the basis for a search among the contents of the memory 75.

The memory 75 (which may be a volatile or nonvolatile memory) may include an image feature database 82. In this regard, for example, the image feature database 82 may include source images or features of source images for comparison to the indications of the image (e.g., an image captured by or in the viewfinder of the camera module 36). As indicated above, the memory 75 could be remotely located from the mobile terminal 10 or partially or entirely located within the mobile terminal 10. As such, the memory 75 may be memory onboard the mobile terminal 10 or accessible to the mobile terminal 10 that may have capabilities similar to those described above with respect to the visual search database 53 and/or the visual search server 51. Alternatively, the memory 75 could be embodied as the visual search database 53 and/or the visual search server 51.

In an exemplary embodiment, at least some of the images stored in the memory 75 may be source images associated with objects or tags having a predefined association. In this regard, the predefined association may map a particular object to a particular location, a particular service type or types, a particular theme, and/or the like. In one embodiment, the memory 75 may store a plurality of predefined associations, for example, in a list. Thus, once indications of a particular image are matched to a source image (e.g., by the processing element 74 or the context determiner 76), the list may be consulted by the processing element 74 to determine whether the object associated with the source image (and therefore also associated with the image) has a corresponding predefined association.

The context determiner 76 may be any means such as a device or circuit embodied in either hardware, software, or a combination of hardware and software that is configured to determine the context of the user based on information available at or supplied by the user's device (e.g., the mobile terminal 10). Thus, the context may be determined from the status of applications on the device, the location of the device, a determination of a predefined association for a particular object, or any other mechanism for discovering the types of context information described above. However, as indicated above, the context determiner 76 may also or alternatively determine context based on the recognition of tags or objects within images. The tags could be actual tags, such as those described below, or virtual tags (e.g., objects detected by visual search and having a predefined association). The actual tags may be disposed on buildings, street signs, posters, billboards, or any easily visible location. The virtual tags (e.g., objects) may be any object that corresponds to an object having a predefined association, for example, that may be determinable using visual search techniques.

In one exemplary embodiment, indications of an image including an object or tag that corresponds to an object associated with a source image based on a visual search or having some other predefined association may provide context information for use in accordance with embodiments of the present invention. In this regard, for example, the context determiner 76 may, in one exemplary embodiment, include an algorithm, device or other means for performing content based searching with respect to indications of an image received (e.g., a raw image, a compressed image, and/or features of an image) by comparing the indications of the image, which may include an object or features of the object, to other images in the memory 75 (e.g., the image feature database 82). As such, the context determiner 76 may be configured to compare the indications of the image to source images to find a source image substantially matching the indications of the image with regard to at least one feature (e.g., corresponding to features of the object or tag). Accordingly, an object or tag associated with the image may be correlated to a particular object or tag associated with the source image in which the particular object has a corresponding predefined association.

As another alternative, the object or tag could be embodied as a uniform resource locator (URL), a codeword, a RFID tag or a barcode. In this regard, the URL, codeword, RFID tag and/or barcode (generally referred to as tags) may be specifically associated with a service related to providing guidance to a user such that the user is not informed of the destination until the destination is reached. In some instances, businesses may register with the service, for example, as an advertising mechanism. Accordingly, a business that is registered with the service may have priority with regard to selection of a destination for a user expressing an interest in being guided to an unknown location. Such priority may then be considered along with the user's context and other user information for selection of a destination for the user. The service may be mutually beneficial for businesses seeking new customers and terminal users that wish to be exposed to new and different locations. In some embodiments, a user that is guided to a particular destination may be enabled to provide feedback regarding the destination (e.g., to the destination selector/guide 80) for rating purposes, which may also be used to assist in destination selection.

The tag may have a predefined association with its respective location, with particular services (e.g., services within a predefined threshold distance of the tag), with a particular topic or theme, etc. Accordingly, when the object or tag comprising the tag is recognized, the object or tag may provide information useful for determining the user's context. For example, the object or tag may be used to define the spatio-temporal context of the user. Moreover, conditions surrounding the object or tag could be used to provide environmental context. Other context information may also be gathered and used in combination with or instead of the information above to provide context to the destination selector/guide 80 for use in determining a destination to which the user may be guided. However, the predefined association of the object or tag may be further utilized for determining a destination to which the user may be guided in accordance with embodiments of the present invention. Furthermore, user information, which is described in greater detail below, may also be used for determining the destination.

In this regard, for example, user information may include user preferences, user profile information, or other indications of user activity. User preferences may be defined either prior to or during the acquisition of context information. For example, prior to gathering context information (e.g., by capturing an image or pointing the camera module 36 such that an object or tag is within the field of view of the camera module 36), the user may input some information to provide a clue as to for which type of location or service the user is currently interested in receiving guidance instructions. Alternatively, the user may input some information while focusing on a particular object or tag. For example, the user may type in a text entry stating "I'm hungry" and then focus on a particular object or tag, or the user may focus on a particular object or tag and then enter the text phrase "I'm hungry" or something else indicating an interest in obtaining food. The context determiner 76 may then communicate the current context (based on the location of the user as determined by the tag or object itself, by GPS, cell ID or another location determining mechanism, or the like) and the context information along with the user information may be communicated to the destination selector/guide 80 to determine a destination for the user based on the context and the user information.

In another exemplary embodiment, the user may register for a service related to guidance to a destination determined by the service that is to be kept unknown to the user until the user is proximate to the destination. During the registration, the user may provide personal information (e.g., age, gender, occupation, interests (e.g., food, entertainment, music, services, and/or the like), schedule information, etc.), or other rule based preferences, to be kept in a user profile associated with the user. Accordingly, when the user elects to engage the guidance service associated with the registration, the user profile may be consulted to determine, based on the user's current context (e.g., as determined by a tag or object captured in an image), a destination to which the user may be guided by the destination selector/guide 80. The creation of the user profile may also be accomplished in the absence of registering for a service.

User information may also be determined based on current or recent user activities. In this regard, for example, the service related to guidance to a destination that remains unknown to the user until the destination is reached (or almost reached), may be enabled to monitor the recent web page downloading activity, calendar events, media activity (e.g., recent movies or music downloaded, purchased, or rendered), and/or the like, in order to determine a profile of the user, for example, via the context determiner 76 or the processing element 74. In some embodiments, the travel or position history of the user may also be used to profile the user.

The destination selector/guide 80 may be any means such as a device or circuit embodied in either hardware, software, or a combination of hardware and software that is configured to determine a destination based on context information and user information and to provide guidance instructions to the user to enable the user to navigate a route to the determined destination. In an exemplary embodiment, the destination selector/guide 80 may further be configured to maintain the identity of the destination unknown to the user until the user is proximate to, or has arrived at, the destination. Accordingly, the user may receive instructions to an unknown location, and the identity of the location may only be revealed to the user when the user has reached the location or the last checkpoint prior to reaching the location.

Figure 4:
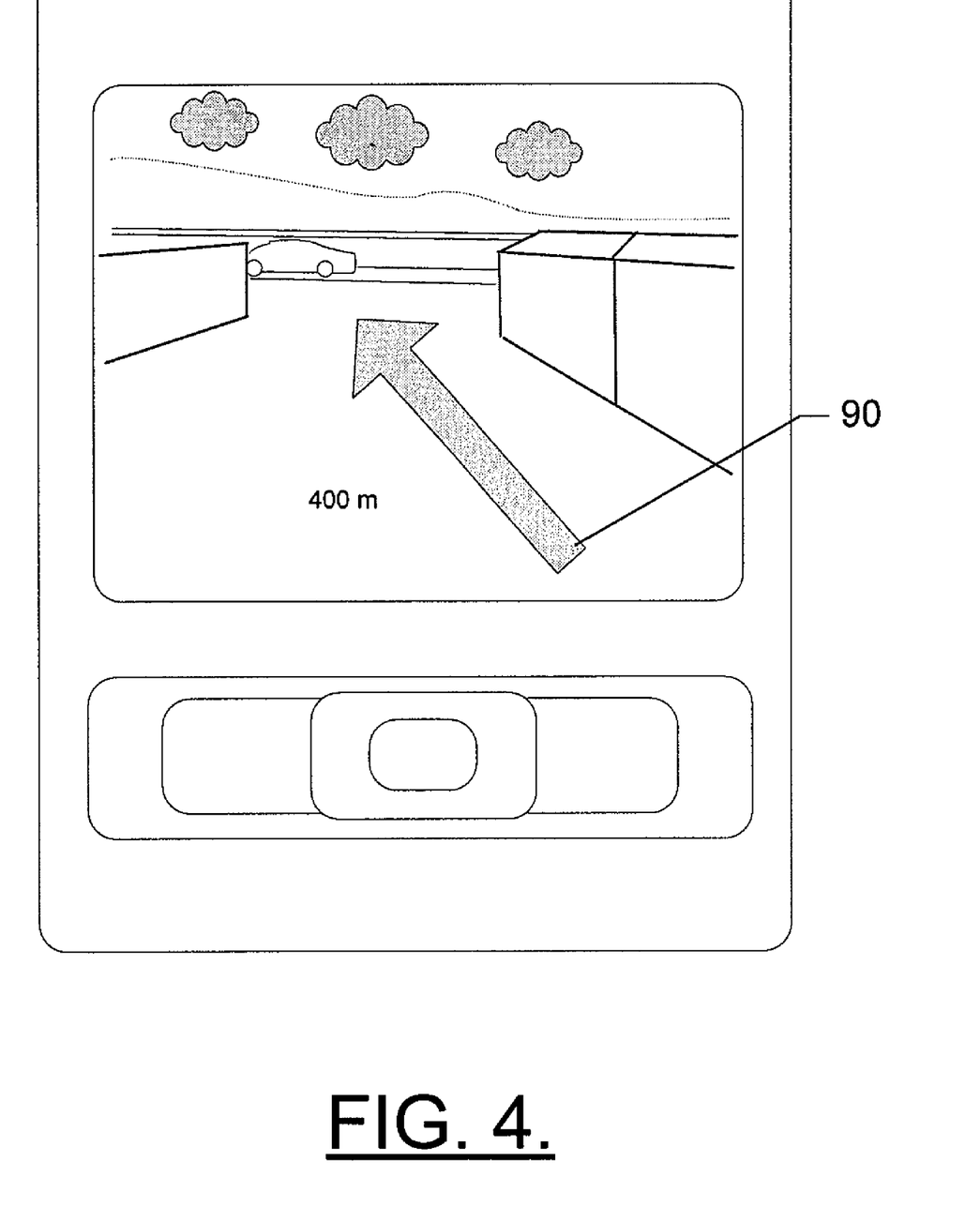
FIG. 4 illustrates an example of a mobile terminal display and a corresponding visual indicator according to an exemplary embodiment of the present invention.

In some embodiments, the destination selector/guide 80 may provide a visual indicator (e.g., an arrow) to be added to live video (e.g., image data currently within the field of view of the camera module 36) to indicate directions to the user. As such, for example, once the user initiates the operation of the destination selector/guide 80 (e.g., by focusing the camera module 36 onto a tag or object that is recognized as having a predefined association within the context of an embodiment of the present invention), the current view rendered on the display of the mobile terminal 10 may indicate a direction in which the user ought to travel in order to discover the determined destination. In some embodiments, a characteristic of the visual indicator may change based on proximity to the destination. For example, a characteristic of the visual indicator may change as the user gets nearer to the destination. In this regard, for example, the arrow may change in size or the color of the arrow may change to indicate position relative to the destination. Alternatively, other indications such as sound, vibration, flashing or other effects may be provided to indicate position relative to the destination without revealing the destination until the user is proximate to the destination. As yet another alternative a characteristic of the visual indicator may change based on the destination itself. For example, if the destination is a rock music themed bar, the visual indicator may give visual hints that the destination is associated with rock and roll. FIG. 4 illustrates an example of a mobile terminal display and a corresponding visual indicator 90. Moreover, in some embodiments, the visual indicator may include or be accompanied by distance information.

Directions may be provided with reference to the tag itself (e.g., as a starting point). In other words, the arrow may be pointing in a direction with reference to the tag's initial position to ensure the correct arrow directions are provided. However, if the mobile terminal 10 is equipped with GPS positioning capability, a compass, or some other position determining mechanism, arrow or compass directions may be provided with reference to the user's current position.

Alternatively, the destination selector/guide 80 may provide standard navigational instructions with turn and distance to the turn type instructions provided. Such information may be presented in addition to or instead of presenting live video relating to the image data currently within the field of view of the camera module 36. In some embodiments, a map view with turn by turn instructions may be provided. However, in this case as well, the destination may not be revealed until the user is proximate to the destination. In any case, upon arriving at the destination, the user may be informed of the arrival. In this regard, the user may be provided with a name, address or other indicia that the user is at the destination. Alternatively, for example, sound, vibration, text, graphics or other mechanisms may be utilized to identify that the user is at the destination.

As indicated above, the user may provide feedback regarding a destination that has been visited. In some embodiments, the user may select an option (e.g., in an options menu) in order to provide the feedback. However, as an alternative, the user's feedback may be solicited if a predefined period of time has elapsed after the destination has been reached, or when it is detected that the user has left the destination. In some embodiments, upon reaching the destination the user may be presented with an option to provide initial feedback, or select a different destination. In this regard, the different destination may be selected in a fashion similar to that described above (e.g., without revealing the different destination to the user) or the different destination may be selected by conventional methods.

Initiation of guidance services may be accomplished in different ways. For example, in one embodiment, the guidance services may be associated with a particular application that may be executed by the mobile terminal 10. As such, upon initiation of the application, any object or tag that is identified may invoke a determination of a destination for the user. In this regard, the mobile terminal 10 (e.g., the guidance client 69) may, for example, send information identifying the user and information identifying the object or tag to a network device (e.g., the destination selector/guide 80 and/or the context determiner 76), which information may be used by the destination selector/guide 80 to select a destination for the user. Alternatively, the mobile terminal 10 may have the context determiner 76 and/or the destination selector/guide 80 embodied within the mobile terminal 10. Guidance instructions to the selected destination may be provided from a server (e.g., the guidance server 55) that may include the destination selector/guide 80, or from the mobile terminal 10 itself if the destination selector/guide 80 is embodied thereat. Because the destination is selected, at least in part, based upon user information, the same object or tag may be simultaneously recognized by two different users and the users may each be guided to two separate destinations that may be selected based on their respective preferences, activities, profile or the like.

In some instances, for example, where the tag is a barcode or other tag specifically associated directly with a guidance service, each tag may be further specifically associated with corresponding different businesses, services, venues, locations, tourist destinations, etc., that have registered with the guidance service for association with the respective tag. For example, a specific business could register to be associated with all tags within a particular distance from the address of the business, or with tags along a particular street or in another specific location. Based on user information, the specific business may be a candidate for selection as a destination for the user. However, the guidance service may also utilize publicly available information or information provided by other users associated with the service to generate or determine candidate destinations to be associated with any particular tag or object.

Factors such as time of day (which may be indicative of meal times, open/closed times for businesses or venues, or the like), season, day of the week, date, etc., may also be used by the destination selector/guide 80 in determining a destination to which the user may be guided. In some embodiments, when a tag or object is determined, the destination selector/guide 80 may issue a query to the user to assist in determining the user's particular interest. For example, if an object (e.g., an object that may easily be associated with two different types of destinations) is recognized, the destination selector/guide 80 may query the user as to which type of destination the user currently prefers. As such, for example, if the user captures an image of an individual wearing a "Hard Rock Cafe" shirt, the user may receive a query as to whether the user is interested in music or food. Based on the user's response, the destination selector/guide 80 may select a corresponding destination to which the user may be guided. Upon selection of the destination by the destination selector/guide 80, the user may automatically be provided with instructions to the destination. Thus, for example, after the object or tag is recognized, the visual indicator may begin pointing the way to the destination. In some embodiments, when the user is focusing on a particular object, the user may be provided with an indication as to when the object has been identified, so the user knows that it is no longer necessary to focus on the particular object.

By way of another example, the destination selector/guide 80 may receive the destination to which the user may be guided from an individual, such as an acquaintance of the user. In this instance, upon the identification of a tag, the destination selector/guide 80 may present the user with an option to have the destination selected by a particular acquaintance or by an individual selected from among a designated group, such as from a list of acquaintances compiled from user profile entries, social network services, e.g., www.facebook.com and/or www.jaiku.com, to which the user belongs, or address book or contact entries associated with the mobile terminal 10. In instances in the user does not identify a particular individual to provide the destination, the destination selector/guide 80 can determine the individual to select the destination. While the destination selector/guide 80 need not identify the individual to the user, the destination selector/guide 80 of one embodiment may identify the individual that is to select the destination, either specifically by name or more generally in terms of the group, e.g., friends, to which the individual belongs. The individual selected to provide the destination may have previously provided a recommendation of a destination that is merely accessed by the destination selector/guide 80. In this regard, the destination selector/guide 80 may accept destination recommendations from third parties with the destination recommendations being targeted, in one example, to a particular user or to some group of users. Alternatively, the individual selected to provide the destination may be contacted by the destination selector/guide 80, such as by means of an email or SMS transmitted to the individual, in order to solicited a recommendation of a destination. While the recommendation of destinations by a third party may provide an additional degree of interest and intrigue to the service, the destination selector/guide 80 can impose some limitations upon the recommended destinations and, as such, may not direct the user to recommended destinations that are more than a predefined distance from the user.

By way of another example, the guidance service provided in accordance with embodiments of the present invention may function as a dating or friend meeting service in which two or more users are concurrently guided from different starting locations to a common destination in order to meet one another. In this example, the processing element 74 may determine that two or more users who are each looking to do something with a friend, such as based upon user input, either know one another, such as a result of being included in a contacts database or being identified in prior messages or telephone calls that have been exchanged, or have similar profiles or preferences. Based on instructions from the processing element, the guidance device 80 may then direct each user to the same destination, thereby permitting the users to meet one another. For example, two users whose profiles both indicate an interest in golf but who are looking for a playing partner may both be directed to the same golf course. In accordance with embodiments of the present invention, the guidance system 70 may provide directions to the common destination, but may fail to reveal the destination to either user prior to their arrival at the destination, thereby heightening the surprise and suspense.

In one embodiment, the guidance system 70 may reward the user in order to incent use of the system. As noted above, one type of reward that is provided to users is the excitement generated by being guided to a destination that is personally tailored to the user's interests. Although this type of reward is frequently sufficient, the guidance system may offer additional rewards in some instances, such as during the initial introduction of the guidance system. For example, in instances in which the user has successfully followed the directions and arrived at the destination (as indicated, for example, by the current location of the user's electronic device), the processing element 74 can be configured to provide the user (such as via the user interface component 72) with a code or other indicia which may be presented for redemption of the reward. For example, the user can present the code to personnel at the destination, such as a restaurant, in order to entitle the user to free or discounted merchandise, such as a free drink, a free record, a free ticket to a concert or theater or the like. Alternatively, the reward may be provided by an entity other than the destination.

Further, the guidance system 70 may be configured to provide advertisements to the user, thereby potentially generating revenue for the provider of the guidance service from the various advertisers. The advertisements may be provided in various manners, but, in one embodiment, are associated with the tag(s). In this embodiment, a tag may be associated with an advertisement, such as a visual advertisement, either textual, pictorial or both, an audio advertisement or the like, that is presented for viewing by the user. For example, in instances in which the guidance client 69 identifies a tag, the advertisement associated with the tag and its method of delivery may also be identified, such as by the processing element 74. As such, a visual advertisement associated with a tag may be printed in hardcopy or may be provided to the user's mobile terminal for display thereon. Additionally, or alternatively, an audio advertisement associated with a tag may be delivered to and played by the user's mobile terminal. Still further, the processing element may provide for the display of advertisement(s) upon the display of the mobile terminal as the user is being directed to the destination. Since the processing element has generally accessed the profile or preferences of the user in conjunction with a determination of the destination, the processing element can tailor the advertisements based upon the profile or preferences of the user. For example, in instances in which the user is a fan of rock music, the processing element may provide for the display of advertisements related to new rock bands while the user is being directed to the destination, such as a bar or other venue at which rock music will be performed. In conjunction with the advertisements, a code or other indicia may also be provided to provide a reward to the user as described above in the form, for example, of a free meal or free tickets in order to incent the user to utilize the guidance service and to view the corresponding advertisements.

Figure 5:
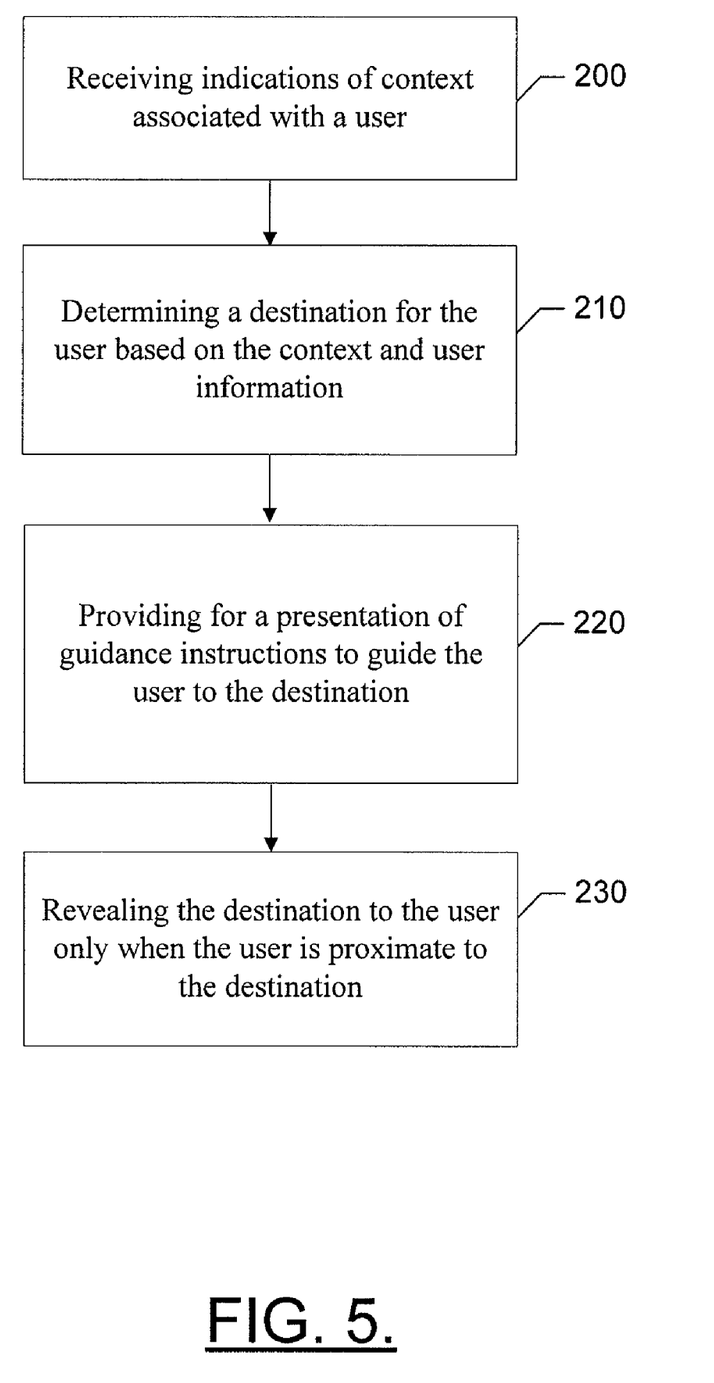
FIG. 5 is a flowchart according to an exemplary method for providing instructions to a destination that is revealed upon arrival at the destination according to an exemplary embodiment of the present invention.

FIG. 5 is a flowchart of a method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or server and executed by a built-in processor in a mobile terminal or server. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing standard real world to virtual world links as illustrated, for example, in FIG. 5, may include receiving indications of context associated with a user at operation 200. At operation 210, a destination for the user may be determined based on the context and user information. A presentation of guidance instructions may be provided in order to guide the user to the destination at operation 220. At operation 230, the destination may be revealed to the user only when the user is proximate to the destination. In an exemplary embodiment, an optional additional operation of receiving feedback from the user regarding the destination may also be included.

In an exemplary embodiment, operation 200 may include receiving indications of an image containing an object, determining whether the object corresponds to a particular object having a predefined association, and, in response to the object corresponding to the particular object, utilizing the predefined association in determining the destination. In some embodiments, determining whether the object corresponds to the particular object may include comparing features of the image to source images including object features to find a corresponding object having features matching the features of the image and determining whether the corresponding object is in a list of particular objects having respective predefined associations.

Operation 210 may include utilizing user information comprising user preferences, a user profile or user activity for selecting the destination from among a plurality of candidate destinations and/or selecting one destination among a plurality of candidate destinations that each correspond to an entity that has registered for inclusion as a candidate destination. In some embodiments, providing for the presentation of guidance instructions may include providing a display of a visual indicator indicating a direction of travel toward the destination. In this regard, for example, a change to a characteristic of the visual indicator may be provided based on proximity to the destination or a theme associated with the destination.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving indications of context associated with a user;
determining, by a processor, a destination for the user based on the context and user information;
determining to provide for a presentation of guidance instructions to guide the user to the destination; and
causing, at least in part, a revelation of the destination to the user only when the user is proximate to the destination,
wherein receiving indications of context comprises:
  receiving indications of an image containing an object;
  determining the object corresponds to a particular object having a predefined association; and
  in response to the object corresponding to the particular object, causing, at least in part, the predefined association in determining the destination to be utilized, and
wherein determining the object corresponds to the particular object comprises:
  comparing features of the image to source images including object features to find a corresponding object having object features matching the features of the image; and
  determining the corresponding object is one of a plurality of particular objects having respective predefined associations.

2. The method of claim 1, wherein determining the destination comprises utilizing user information comprising user preferences, a user profile or user activity for selecting the destination from among a plurality of candidate destinations.

3. The method of claim 1, wherein determining to provide for the presentation of guidance instructions comprises providing a display of a visual indicator indicating a direction of travel toward the destination.

4. The method of claim 3, wherein determining to provide the display of the visual indicator further comprises providing a change to a characteristic of the visual indicator based on proximity to the destination or a theme associated with the destination.

5. The method of claim 1, wherein determining the destination comprises selecting one destination among a plurality of candidate destinations that each correspond to an entity that has registered for inclusion as a candidate destination.

6. The method of claim 1, further comprising receiving feedback from the user regarding the destination.

7. A computer program product comprising at least one computer-readable storage medium having computer-readable program code portions stored therein, the computer-readable program code portions comprising:
a first executable portion for receiving indications of context associated with a user;
a second executable portion for determining a destination for the user based on the context and user information;
a third executable portion for providing for a presentation of guidance instructions to guide the user to the destination; and
a fourth executable portion for revealing the destination to the user only when the user is proximate to the destination,
wherein the first executable portion includes instructions for:
  receiving indications of an image containing an object;
  determining the object corresponds to a particular object having a predefined association; and
  in response to the object corresponding to the particular object, causing, at least in part, the predefined association in determining the destination to be utilized, and
wherein the first executable portion includes instructions for:
  comparing features of the image to source images including object features to find a corresponding object having object features matching the features of the image; and
  determining the corresponding object is one of a plurality of particular objects having respective predefined associations.

8. The computer program product of claim 7, wherein the second executable portion includes instructions for utilizing user information comprising user preferences, a user profile or user activity for selecting the destination from among a plurality of candidate destinations.

9. The computer program product of claim 7, wherein the third executable portion includes instructions for providing a display of a visual indicator indicating a direction of travel toward the destination.

10. The computer program product of claim 9, wherein the third executable portion includes instructions for providing a change to a characteristic of the visual indicator based on proximity to the destination or a theme associated with the destination.

11. The computer program product of claim 7, wherein the second executable portion includes instructions for selecting one destination among a plurality of candidate destinations that each correspond to an entity that has registered for inclusion as a candidate destination.

12. The computer program product of claim 7, further comprising a fifth executable portion for receiving feedback from the user regarding the destination.

13. An apparatus comprising:
at least one processor; and
at least one memory including computer program code for one or more programs,
the at least one memory and the computer program code configured to, with the at least one processor, cause the apparatus to perform at least the following,
receive indications of context associated with a user;
determine a destination for the user based on the context and user information; provide for a presentation of guidance instructions to guide the user to the destination; and
reveal the destination to the user only when the user is proximate to the destination,
wherein the apparatus is caused to receive indications of context by:
  receiving indications of an image containing an object;
  determining the object corresponds to a particular object having a predefined association; and
  in response to the object corresponding to the particular object, causing, at least in part, the predefined association in determining the destination to be utilized, and
wherein the apparatus is caused to determine whether the object corresponds to the particular object by:
  comparing features of the image to source images including object features to find a corresponding object having object features matching the features of the image; and determining the corresponding object is one of a plurality of particular objects having respective predefined associations.

14. The apparatus of claim 13, wherein the apparatus is further caused to determine the destination by utilizing user information comprising user preferences, a user profile or user activity for selecting the destination from among a plurality of candidate destinations.

15. The apparatus of claim 13, wherein the apparatus is caused to provide for the presentation of guidance instructions by providing a display of a visual indicator indicating a direction of travel toward the destination.

16. The apparatus of claim 15, wherein the apparatus is caused to provide the display of the visual indicator by providing a change to a characteristic of the visual indicator based on proximity to the destination or a theme associated with the destination.

17. The apparatus of claim 13, wherein the apparatus is further caused to determine the destination by selecting one destination among a plurality of candidate destinations that each correspond to an entity that has registered for inclusion as a candidate destination.

18. The apparatus of claim 13, wherein the apparatus is further caused to receive feedback from the user regarding the destination.

19. An apparatus comprising:
means for receiving indications of context associated with a user;
means for determining a destination for the user based on the context and user information;
means for providing for a presentation of guidance instructions to guide the user to the destination; and
means for revealing the destination to the user only when the user is proximate to the destination,
wherein receiving indications of context comprises:
receiving indications of an image containing an object;
determining the object corresponds to a particular object having a predefined association; and
in response to the object corresponding to the particular object, causing, at least in part, the predefined association in determining the destination to be utilized, and
wherein determining the object corresponds to the particular object comprises:
comparing features of the image to source images including object features to find a corresponding object having object features matching the features of the image; and
determining the corresponding object is one of a plurality of particular objects having respective predefined associations.

* * * * *